United States Patent
Nakagawa et al.

(10) Patent No.: US 6,374,178 B2
(45) Date of Patent: *Apr. 16, 2002

(54) TRANSPORTATION ARRANGEMENT SYSTEM AND TRANSPORTATION ARRANGEMENT APPARATUS

(75) Inventors: Kazuya Nakagawa, Hachiouji; Tsuyoshi Aida, Ibaraki; Kazuhiro Kumamoto, Nishinomiya; Nobuyuki Konishi, Nishinomiya; Hajime Nishida, Nishinomiya, all of (JP)

(73) Assignee: Suntory Limited, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/483,001

(22) Filed: Jan. 14, 2000

Related U.S. Application Data

(63) Continuation of application No. PCT/JP99/02534, filed on May 14, 1999.

(30) Foreign Application Priority Data

May 15, 1998 (JP) ............................................. 10-133892
Sep. 30, 1998 (JP) ............................................. 10-277919

(51) Int. Cl.$^7$ .............................................. G01C 21/00
(52) U.S. Cl. ...................... 701/202; 701/209; 340/988
(58) Field of Search ................................. 701/200, 202, 701/209, 210; 705/8, 22; 340/988, 990, 998

(56) References Cited

U.S. PATENT DOCUMENTS

| | | | | |
|---|---|---|---|---|
| 5,719,771 A | * | 2/1998 | Buck et al. ................. | 701/200 |
| 5,797,113 A | * | 8/1998 | Kambe et al. ............... | 701/202 |
| 5,835,376 A | * | 11/1998 | Smith et al. ................. | 701/209 |
| 5,983,198 A | * | 11/1999 | Mowery et al. ............. | 701/202 |

FOREIGN PATENT DOCUMENTS

| | | |
|---|---|---|
| JP | 02-112100 | 4/1990 |
| JP | 05-189451 | 7/1993 |
| JP | 5-298592 | 11/1993 |
| JP | 07-234997 | 10/1994 |
| JP | 07-081722 | 3/1995 |
| JP | 08-115495 | 5/1996 |
| JP | 08-212494 | 8/1996 |
| JP | 08-329149 | 12/1996 |
| JP | 06-290185 | 2/1999 |
| JP | 10-055349 | 2/1999 |

\* cited by examiner

*Primary Examiner*—Gary Chin
(74) *Attorney, Agent, or Firm*—Burns, Doane, Swecker & Mathis, L.L.P.

(57) ABSTRACT

A transportation arrangement center for drawing up an operations plan is arranged between shippers and both physical distribution centers and transportation bases. The transportation arrangement center is provided with a master data managing unit for managing cargo item data, physical distribution center data, and vehicle and garage data concerning vehicles managed by the transportation bases and their garages and with a route making unit for making routes, taking in consideration also priority vehicles, based on the data of the cargoes, physical distribution centers, vehicles, and garages. The route making unit sets the efficient routes satisfying the transportation orders from the shippers and the restraint conditions on operation, minimizing the number of vehicles dispatched, and selecting the optimum transportation bases. This gives a transportation arrangement system capable of improving the physical distribution efficiency while keeping down the total number of vehicles dispatched.

13 Claims, 9 Drawing Sheets

Fig.6

| No. | | | 00 9:00 10:00 11:00 12:00 13:00 14:00 15:00 16:00 17:00 18:00 19: | SETTLED |
|---|---|---|---|---|
| 1 | α | L | a b c d a b | NG |
| 2 | α | L | e f f g h | NG |
| 3 | β | L | b i j k | OK |
| 4 | α | M | a b c f d a b | OK |
| 5 | γ | M | e l f m | OK |
| 6 | α | M | c d c d a b | OK |
| 7 | β | S | c d c d a b | OK |
| 8 | γ | S | e f h k | OK |
| 9 | | | | |

L: LARGE
M: MIDDLE
S: SMALL

S1　S2　S3

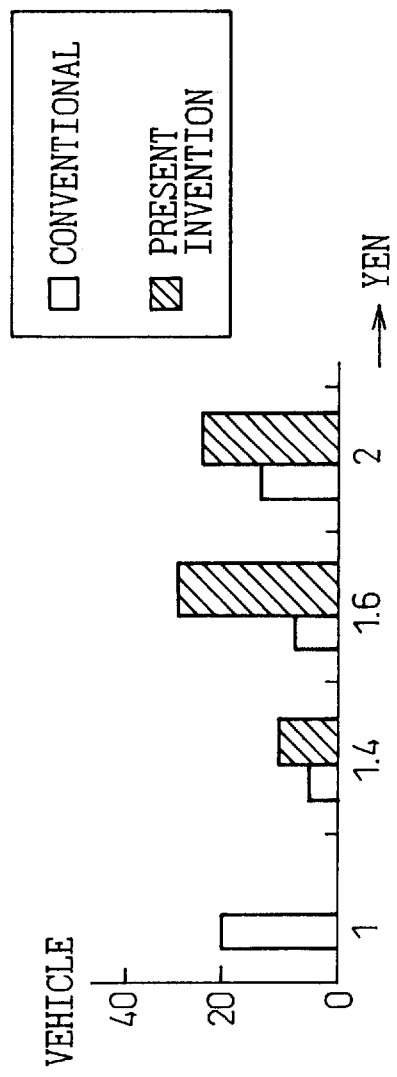

TRANSPORTATION ARRANGEMENT SYSTEM AND TRANSPORTATION ARRANGEMENT APPARATUS

This application is a continuation of International Application No. PCT/JP99/02534, filed on May 14, 1999, which International Application was published by the International Bureau in Japanese on Nov. 25, 1999.

TECHNICAL FIELD

The present invention relates to a transportation arrangement system, more particularly relates to a transportation arrangement system including a plurality of physical distribution centers for loading and unloading various types of cargoes and a plurality of transportation bases for transporting the cargoes among these plurality of physical distribution centers by a plurality of vehicles, and to a transportation arrangement apparatus for planning an optimum transportation arrangement plan in that transportation arrangement system.

In the current physical distribution field, which transports cargoes in accordance with instructions from the shippers, there are the following problems.

Namely, <1> the cargo items being transported have been increasing and becoming more complicated along with the diversification of consumer needs and the intensifying competition among businesses and therefore the physical distribution has become more inefficient. <2> The roads are becoming increasingly congested and consequently it is not easy to realize a delivery of cargoes in a manner precisely meeting with the customers' wishes due to traffic jams etc. <3> Further, in some countries, the physical distribution field is made up of a large number of small businesses—which makes it vulnerable when attempting to streamline it as an important industry forming a key part of the economic infrastructure. <4> In addition, at present, carriers draw up their own transportation plans independently for respective orders received from shippers and transport the cargoes based on the same. As a result of the above, there are many problems when trying to significantly increase the efficiency of physical distribution. <5> Further, there are strong pressures for reduction of the $CO_2$, $NO_x$, and the like emitted from the huge number of trucks in view of global environmental problems.

The present invention describes a transportation arrangement system for solving these various problems.

BACKGROUND ART

In the conventional physical distribution field, the carriers draw up their own transportation plans independently with respect to respective orders received from the shippers and transport the cargoes based on the same. For this reason, individual transportation companies have each tried to increase the efficiency of their physical distribution within their own carriers, for example, tried to shorten the transportation hours and reduce the number of vehicles used.

The main problem in transportation being tackled by the individual carriers had boiled down to "shortening of the transportation hours and improvement of the accuracy of the transportation schedule" in consideration of the increase and greater complexity of the cargoes being transported and the traffic conditions on the roads. Namely, in previous transportation arrangement systems, various efforts were made to more efficiently calculate the optimum and shortest route from the location where a cargo was loaded to the location where the cargo was to be delivered. Many proposals have been made for this purpose.

Further, turning to the transportation arrangement apparatus—a main component of the above transportation arrangement system—, when drawing up a transportation arrangement plan, the apparatus must produce a plan that will achieve the prescribed target (for example, minimization of the total number of vehicles required) while satisfying restraint conditions. The operation for this purpose corresponds to finding a solution of an optimization problem having restraint conditions. This optimization problem is one where, by nature, the problem solving usually becomes dramatically more difficult, that is, an enormous amount of time is required for finding the solution, along with an increase in the size of the problem concerned (for example, the number of orders for transportation and the number of orders for delivery). Efforts are being made, for example, as proposed below, in order to solve this.

First, Japanese Unexamined Patent Publication (Kokai) No. 8-115495 discloses to divide the destinations of cargoes requested to be transported into a plurality of areas and determine the route for every area, while excluding deliveries spanning several adjoining areas from consideration, and thereby reduce the size of the above problem.

Next, Japanese Unexamined Patent Publication (Kokai) No. 2-112100 discloses to achieve a predetermined objective, for example, the objective of minimizing the total number of vehicles required, by simultaneously processing a "phase", for problem solving for the optimization of this objective and a "phase" for problem solving for satisfying the restraint condition, for example, the designated operating hours in an operating day, so as to solve the optimization problem having a restraint condition.

While individual carriers have therefore been trying to improve the efficiency of physical distribution on their own within the bounds of their carriers, however, at the current time no major improvement in efficiency of physical distribution has been realized and the above problems in the physical distribution field have not been solved. For this reason, the issue to be tackled is not limited to the transportation hours such as the "shortening of the transportation hours and the improvement of the accuracy of the transportation schedule", but further includes how to deal with the daily fluctuations in the variety and volume of cargoes handled, of course, and also how to deal with changes in the physical distribution network so as to streamline the physical distribution and, as a result, contribute to the solution of environmental problems as well.

In consideration with such a situation, the present inventors engaged in an intensive study on the how to reduce the total number of vehicles used in actual daily operations and as a result perfected a transportation arrangement system for a physical distribution field comprising a plurality of shippers, a plurality of physical distribution centers for loading and unloading a plurality of cargoes and a plurality of transportation bases for transporting the plurality of cargoes among the physical distribution centers by a plurality of vehicles, which minimizes the total number of vehicles used by providing a transportation arrangement center for drawing up an operations plan for a plurality of vehicles in response to transportation orders from a plurality of shippers to integrate the transportation arrangement plans which the carriers have individually drawn up so far.

Further, looking at the transportation arrangement apparatus, the above related art (Japanese Unexamined Patent Publication (Kokai) No. 8-115495 and Japanese Unexamined Patent Publication (Kokai) No. 2-112100) suffered from the following two problems.

<1> Obstacles to Optimization

When dividing destinations into a plurality of areas as disclosed in Japanese Unexamined Patent Publication (Kokai) No. 8-115495, there is the side effect that for example it is difficult to handle deliveries bridging adjoining areas. This is the factor obstructing optimization.

Namely, Japanese Unexamined Patent Publication (Kokai) No. 8-115495 does mention that adjoining areas should swap delivery requests, but since delivery orders are only swapped between adjoining areas, there is still the problem that the optimization is greatly obstructed.

<2> Complexity of System

On the other hand, with processing for problem solving for optimization at the same time as problem solving for satisfying the restraint conditions as disclosed in Japanese Unexamined Patent Publication (Kokai) No. 2-112100, there is the problem that it is not possible to flexibly handle changes in the restraint conditions That is, there is the problem that when there is a change in for example the above designated operating hours and it becomes necessary to add or delete the above restraint condition along with this change, there is somewhat an effect on the phase for the problem solving for the above optimization as well and therefore the total cost required for the change of the system is increased.

DISCLOSURE OF THE INVENTION

Accordingly, an object of the present invention is to provide a transportation arrangement system which enables the total number of vehicles dispatched in an entire physical distribution field to be reduced and as a result, due to the reduction in the number of operating vehicles, not only help streamline the physical distribution, but also contribute to solving problems such as the environmental problem of the need to reduce the amount of $CO_2$, $NO_x$, and other emissions.

Another object of the present invention is to provide a transportation arrangement apparatus capable of planning and executing an optimum transportation arrangement plan while satisfying the requirements for optimization and system maintenance without requiring an enormous amount of time for the problem solving—which usually becomes dramatically more difficult along with an increase in the size of the problem being dealt with (for example, the number of transportation orders).

To attain the above objects, according to the present invention, a transportation arrangement center (5) for drawing up an operations plan is set up between shippers (4) and both physical distribution centers (1) and transportation bases (2). The transportation arrangement center (5) is provided with a master data managing means (6) for managing cargo item data, physical distribution center data, and vehicle and garage data concerning vehicles and garages managed by the transportation bases (2) and with a route making means (7) for making routes, based on the data of the cargo items, physical distribution centers, vehicles and garages, taking into consideration also priority vehicles. The route making means (7) makes an efficient route satisfying the transportation orders from the shipper and the restraint conditions in operations, minimizing the number of vehicles dispatched, and selecting the optimum transportation bases.

BRIEF DESCRIPTION OF THE DRAWINGS

The above object and features of the present invention will be more apparent from the following description of the preferred embodiments given with reference to the accompanying drawings, wherein:

FIG. 6 is a view of an example in which part of a transportation arrangement data file 15 is monitored on a display;

FIGS. 9A, 9B and 9C are views diagrammatically representing effects according to the present invention.

DETAILED DESCRIPTION OF THE INVENTION

Preferred embodiments of the present invention will be described next with reference to the related figures.

Figure 1:
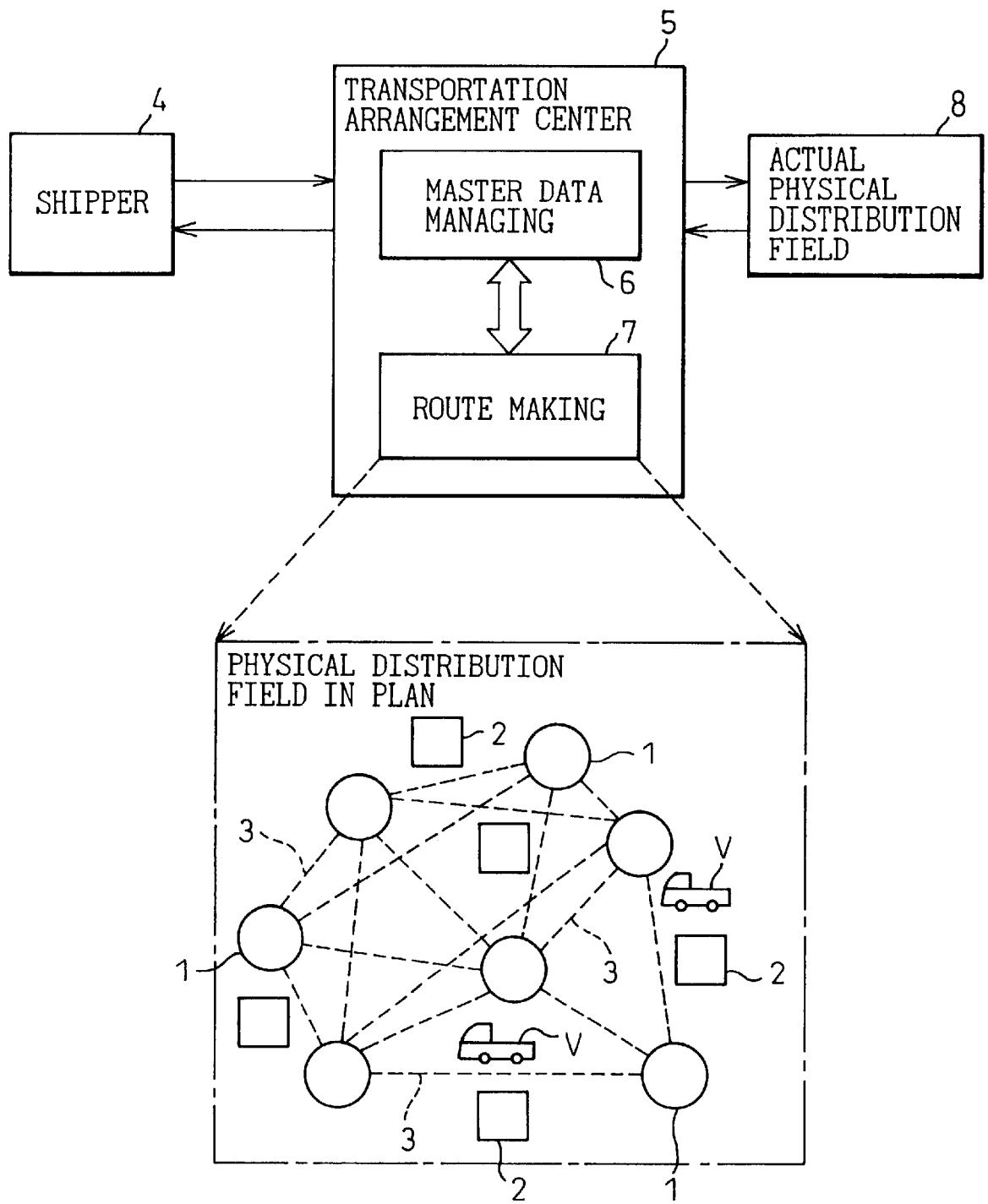
FIG. 1 is a view of the basic configuration of a transportation arrangement system according to the present invention.

FIG. 1 is a view of the basic configuration of a transportation arrangement system according to the present invention. In the figure, reference numeral 1 indicates a physical distribution center (indicated by a circle) such as a warehouse or a factory, 2 is a transportation base (indicated by a square) such as the garage of a carrier managing vehicles, and 3 is a route (indicated by a dotted line) of a vehicle V. These constitute a physical distribution field 8 as a whole. This physical distribution field 8 is managed by a transportation arrangement center 5 based on orders from the shippers 4.

Explaining this in further detail, first, the transportation arrangement system upon which the present invention is predicated is a transportation arrangement system which includes a plurality of physical distribution centers 1 for loading and unloading various kinds of cargoes and a plurality of transportation-bases 2 for transporting cargoes among these plurality of, physical distribution centers 1 by a plurality of vehicles V and which sets operations (sets the routes 3) for the plurality of vehicles V in accordance with the transportation orders from the shippers 4 of the cargoes.

The transportation arrangement system of the present invention is characterized by the following. First, the transportation arrangement center 5 for drawing up the operations plan for the plurality of vehicles V is arranged between shippers 4 and both a plurality of physical distribution centers 1 and transportation bases 2. This transportation arrangement center 5 is provided with a master data managing means 6 and a route making means 7.

The master data managing means 6 manages at least cargo item data concerning various groups of cargoes, physical distribution center data concerning the plurality of physical distribution centers 1, and vehicle and garage data concerning the plurality of vehicles V managed by the plurality of transportation bases 2 and the garages from which these vehicles operate.

The route making means 7 makes the routes for a plurality of vehicles v in accordance with the transportation orders from the shippers 4 based on at least the cargo item data, the physical distribution center data, and the vehicle and garage data which are in the master data managing means 6.

Here, the route making means 7 makes routes 3 which result in the minimum total number of vehicles V dispatched there.

Namely, according to the present invention, among the tasks conventionally performed by individual transportation bases 2 such as (i) coordination with the shippers 4 or other transportation bases, (ii) drawing up plans for the vehicles V they manage themselves, (iii) arranging for the vehicles V, (iv) transporting the cargoes, and (v) managing the business (keeping operations reports, settling charges, etc.), the above (i) coordination and (ii) drawing up of transportation arrangement plans can be carried out centrally by the transportation arrangement center 5 on behalf of all of the transportation bases 2. Further, the transportation arrangement center 5 can even perform the (v) management of the business. Accordingly, this means that each transportation bases 2 need only (iii) arrange for the vehicles it manages itself and (iv) transport the cargoes. Further, this means that a shipper 4 needs only to make a transportation order to the transportation arrangement center 5.

Further important is that the following results are obtained: Namely, the uniformly centralized operations of the transportation arrangement center 5 make it possible to draw up a integrated transportation arrangement plan taking into account all of the physical distribution centers 1, transportation bases 2, and vehicles V at the same time. Therefore, it becomes possible for the transportation arrangement center 5 to make routes for every vehicle based on all of the cargo item data, physical distribution center data, and vehicle and garage data.

This being so, when there is a transportation order from a shipper 4, it becomes possible for the transportation arrangement center 5 to maximize the loading rate (weight and capacity) of each vehicle V to be dispatched as required in the physical distribution field 8, which minimizes the number of vehicles V (total number of trucks) dispatched. That is, by increasing the number of types of cargoes which can be carried together in a vehicle based on the above data, an improvement of the loading rate becomes possible and improvement of efficiency becomes easier.

A physical distribution center is able to control the flow of vehicles to and from it in accordance with its loading capacity, so can eliminate useless waiting time of vehicles and cut down on its load of work.

As a result, the total number of vehicles V operating in the physical distribution field 8 becomes the required smallest number Further, each vehicle V can be fully loaded. This enables the physical distribution to be streamlined and costs to be lowered at all of the shippers, physical distribution centers, and transportation bases, so it is possible not only to deal with social problems, but also to greatly reduce the $CO_2$, $NO_x$, and other emissions discharged from the physical distribution field 8. The latter advantage contributes to the solution to global environmental issues, which is also the greatest advantage resulting from the present invention. This "minimization of the total number of vehicles dispatched" is a quite different approach from the already mentioned "shortening of the transportation hours and improvement of the accuracy of the transportation schedule" in the related art.

Here, the transportation arrangement system of the present invention is utilized not only for actual operations, but also for transportation arrangement simulations conducted taking into account the dispersal of the risks of fluctuations in the amount of orders received and orders and also for being part of the management of physical distribution-related tasks.

Further, looking at the transportation arrangement apparatus, the present invention overcomes the problems of the related art mentioned above (Japanese unexamined Patent Publication (Kokai) No. 8-115495 and Japanese Unexamined Patent Publication (Kokai) No. 2-112100) and solves as well the difficulty in problem solving caused by the large scale problem solving process inherent to a transportation arrangement plan. Specifically, it provides a transportation arrangement apparatus designed by method of three-step problem solving process, as a core, which solves problems by the three phases of (i) set generation, (ii) set linkage, and (iii) route selection.

Details of each step in this three-step problem solving process as given below:

First step: The first step is the step of set generation. Here, transportation orders are sorted according to departure and arrival points of the vehicles and the sorted transportation orders for the same departure and arrival points are assembled, in terms of individual loading capacities of vehicles, to generate sets. In this first step, only maximization of the loading rates of the vehicles need be considered.

Second step: The second step is the step for generating a plurality of routes by linking the sets generated in the previous first step. A plurality of routes serving as candidates capable of satisfying the various types of restraint conditions applied when generating the route are generated. In this second step, only satisfaction of the above restraint conditions need be considered. Note that, as the various types of restraint conditions, as will be mentioned later, there are for example the designation of the time for arrival at the garage for the cargoes, for example the operating hours of a warehouse for the physical distribution center, for example the allowable operating hours for a vehicle, and for example the allowable departure times of a vehicle for a garage.

Third step: The third step is the step for selecting an adequate route from among the plurality of routes generated in the previous second step. Here, only achievement of the prescribed objective, which is expressed by evaluation indicators, need be considered, while satisfying the condition that all of cargoes for which transportation orders have been made are delivered. As the prescribed objective, there is, for example, minimization of the total number of the required vehicles.

The above three-step problem solving process can solve the problems of the related arts (Japanese Unexamined Patent Publication (Kokai) No. 8-115495 and Japanese unexamined Patent Publication (Kokai) No. 2-112100). Namely, <1> The operation of dividing deliveries into areas as in the related art becomes unnecessary and consequently achievement of a higher optimization becomes possible.

<2> The phase for processing the restraint conditions, that is, the second step for generating routes by the set linkage, and the phase for achieving optimization, that is, the third step for selecting a suitable route from among the group of routes generated by the set linkage, are separated, so the range of modifications which have to be made to a system along with a change in the restraint conditions can be kept to only the second step for generating the routes (set linkage). Accordingly, the costs required for modifications to a system can be reduced.

Figure 2:
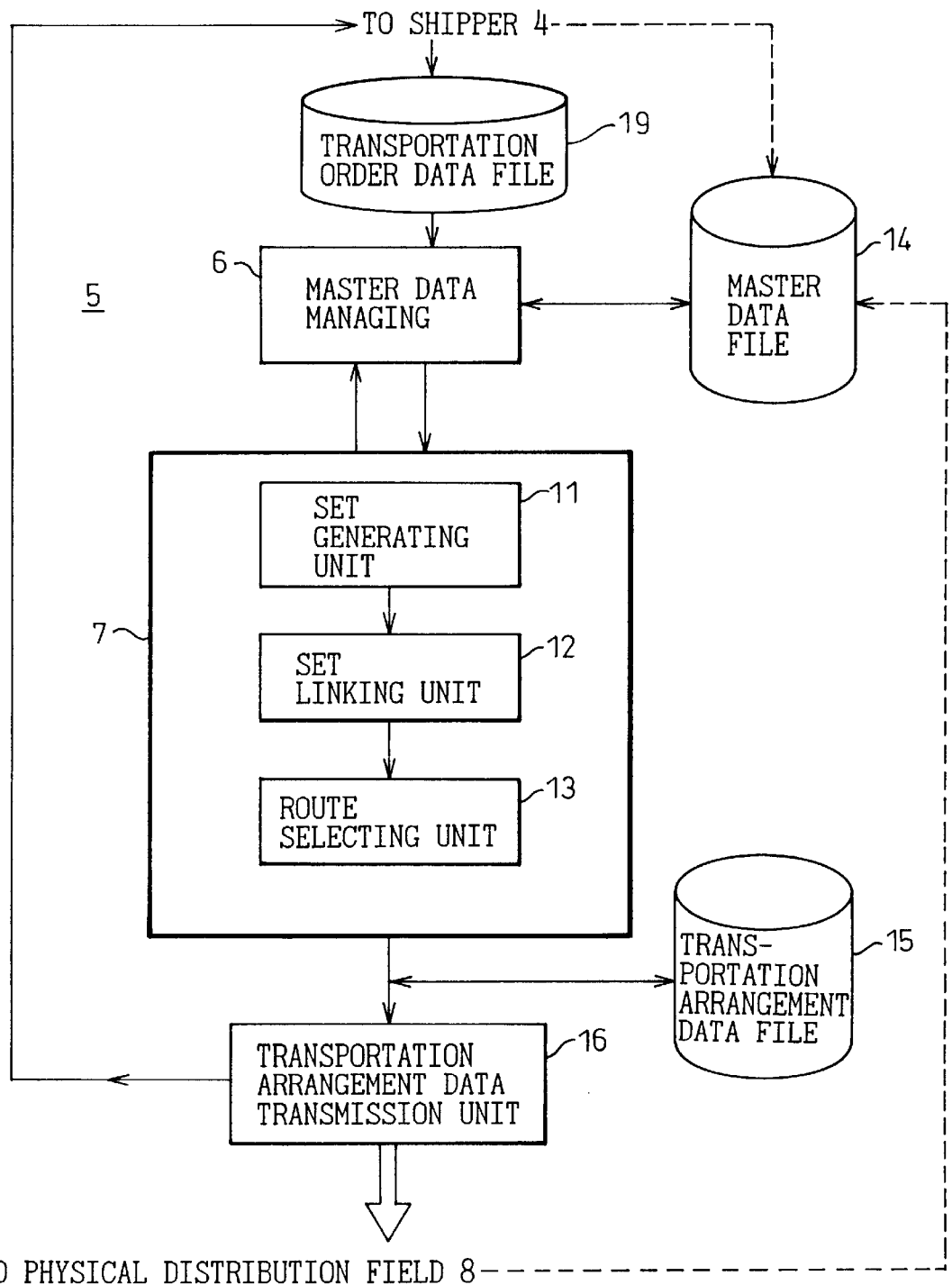
FIG. 2 is a view of an example of a specific block configuration of a transportation arrangement center 5 shown in FIG. 1.

FIG. 2 is a view of an example of a specific block configuration of the transportation arrangement center 5 shown in FIG. 1. Note that the same reference numerals or symbols are given to similar constituent elements throughout all of the drawings.

The transportation arrangement center 5 shown in the present figure comprises the master data managing means 6 and the route making means 7 as mentioned above. The master data managing means 6 cooperates with the master data file 14. In this master data file 14, at least the above cargo item data, physical distribution center data, and vehicle and garage data are rewritably stored. Note that, a transportation order data file 19 is connected to the master data managing means 6 and the data of the transportation orders obtained from a shipper 4 through a transportation order input unit is stored in this transportation order data file 19.

On the other hand, the transportation arrangement plan information output from the route making means 7 is stored once in the transportation arrangement data file 15 and transmitted to each physical distribution center 1 and each transportation base 2 in the physical distribution system 8 via a transportation arrangement data transmission unit 16, for example, in the form of a facsimile or e-mail. The physical distribution center 1 receiving this loads or unloads the designated cargoes with respect to the designated vehicle V at the designated time. Similarly, the transportation base 2 receiving this transportation arrangement data instructs the designated vehicle V to drive from one designated physical distribution center 1 to another designated physical distribution center 1 according to the designated route.

The route making means 7 preferably has an illustrated set generating unit 11 Also, it preferably has an illustrated set linking unit 12. Further, it preferably has an illustrated route selecting unit 13.

Based on above various data, the set generating unit 11 generates, when defining one set of operation data as a group of cargoes able to be loaded on one vehicle V in accordance with the transportation orders from the shippers 4, a plurality of sets, for a plurality of vehicles V, for every departure and arrival location.

In the set generating unit 11, the sets are generated such that the loading rates (weight and capacity) of the related vehicles V become maximum. Note that, in the above set generation, it is also possible to store set restraint parameters in the master data file 14 and adopt the stored set restraint parameters, as fixed values, created by taking a practical use into account, i.e., the safety of loading, rounding up fractions of sets, and so on. This not only makes it possible to streamline the physical distribution and lower costs, but also enables, as a result, the total number of the vehicles V required to be dispatched in the physical distribution system 8 to be kept to a minimum. Such a set generating unit 11 preferably processes the data to be more optimum operation data by working with the set linking unit 12.

When defining a plurality of sets generated by the generating unit 11 as one route, which sets can be linked in series with each other among the plurality of sets generated by the set generating unit 11, the set linking unit 12 sets a plurality of candidates of such routes.

This set linking unit 12 links a first set (operation data), generated first, to a second set (operation data) following thereafter. Further, it links this second set to a third set. This linkage is determined such that, for example, the hours of the vehicle drives empty between the adjoining first set and second set is minimized.

Note that, for the set linkage, the sets to be linked are determined by taking into consideration restraint conditions on operations, for example, the restraint conditions concerning the cargoes, physical distribution centers, and vehicles and garages, and then the route is prepared by those sets. Here, as the restraint conditions concerning cargoes, there can be mentioned:

<1> Designation of arrival time at garage and
<2> Designation of departure time from garage.

As the restraint conditions concerning the physical distribution centers, there can be mentioned:

<1> Operating time of warehouse
<2> Restriction of available types of vehicles; and
<3> Number of vehicles entering and leaving garage per unit hour.

As the restraint conditions concerning the vehicles, there can be mentioned:

<1> Allowable operating hours;
<2> Allowable hours for operating empty; and
<3> Travel hours of vehicles.

As the restraint conditions concerning the garages, there can be mentioned:

<1> Allowable departure time from garage and
<2> Allowable return time to garage.

These are stored in the master data file 14 and used as fixed values representing route restraint parameters.

By linking adjoining two sets based on for example the requirement of minimizing the hours during which a vehicle drives empty, a plurality of routes are generated which not only streamline the physical distribution and lower the costs, but also help to keep down wasteful operation of vehicles and thereby help to great reduce exhaust emissions These routes can at the same time help shorten the transportation hours. Such a set linking unit 12 preferably produces practical operation data by working with the route selecting unit 13.

The route selecting unit 13 selects routes which satisfy the transportation orders input from the shippers and also minimize or maximize a route evaluation indicator stored in the master data file 14 from among the candidates obtained by adding the plurality of routes generated by the set linking unit 12 to all routes each comprising one set. For example, when the prescribed objective is the minimization of the total number of the required vehicles, the unit 13 determines the smallest total number of vehicles which have to drive over the route. Note that if it is determined that the number of vehicles for a route is zero (no solution), it means that the candidate of the corresponding route was not selected.

In order to determine the number of vehicles required to travel over a route, the unit uses, among the information concerning the route generated in the set linking unit 12, the (1) Information concerning route evaluation values obtained by weighting route evaluation indicators representing operating conditions to be noted in operations, for example, the number of vehicles, empty driving hours, overtime hours, left-over hours, returning time, and other route evaluation indicators;

(2) Information concerning the number of sets contained in each route; and (3) Information concerning the number of sets for satisfying the transportation orders to find the number of vehicles which can be assigned to each route.

Here, the problem solving for the route selection can be formulated, as mathematical programming problems, by the following equation (1) and equation (2).

Among the information concerning the route generated in the route generation step by the set generating unit 11 and the set linking unit 12, other information necessary for operation over the route, for example, the information, such as the order of departure and arrival and the departure and arrival time, is recorded on a recording medium such as a memory. When the route selection ends, only the route to which the vehicles are assigned, is put together with the route information and the number of the assigned vehicles so as to constitute the determined route.

$$\text{minimize} \sum_j c_j x_j \tag{1}$$

$$\text{subject to} \sum_j a_{ij} x_j = b_i \text{ for all } i \tag{2}$$

$x_j$: integer wherein i: index of set j: index of route $c_j$: evaluation value of route j $x_j$: number of vehicles travelling over route j (decision variable)

$a_{ij}$: number of sets i contained in route j $b_i$: number of sets i satisfying the transportation orders.

The route evaluation value c, referred to in the above (1) can be defined by for example the following equation:

$$c_j = w1 + w2 \times \text{empty driving hours} + w3 \times \text{overtime hours} + w4 \times \text{left-over hours} + w5 \times \text{returning time} \tag{3}$$

Here, w1 is a weighting parameter of the number of vehicles, and w2 to w5 are weighting parameters of the aforesaid evaluation indicators. These parameters are predetermined as fixed values and stored in the master data file 14 in advance.

When desiring to minimize a particularly noted evaluation indicator among the various types of evaluation indicators (the above empty driving hours, overtime hours, etc.), it is sufficient to make the weighting parameter to be multiplied with that evaluation indicator to be minimized a positive value. Conversely, when desiring to maximize an evaluation indicator, it is sufficient to make the above weighting parameter a negative value. For example, there can be mentioned a case of maximizing the left-over hours so as to secure extra working hours. That is, the weighting parameter is determined in accordance with the degree of attention paid to a corresponding evaluation indicator.

The formulation of the equations (1) and (2) described above are reduced to integer programming problems—a type of the mathematical programming problem—since the decision variable $x_j$ is an integer. As one example of the method of problem solving of such an integer programming problem, there is the branch and bound method indicated in Chapter 4 Ippan no Seisukeikakumondai to Bunkigenteihou (General Integer Programming Problem and Branch and Bound Method) in Seisukeikakuhou to Kumiawasesaitekika (*Integer Programming Method and Optimization of Combination*), Hiroshi Konno and Hisatoshi Suzuki ed., Nikkagiren Shuppansha (issued Jun. 15, 1982). This enables high speed problem solving.

Referring to the above equation (1) again, equation (1) means to minimize the sum of the evaluation values $c_j$ worth of the number $(x_j)$ of vehicles assigned to each route.

For example, where w1 is 1 and w2 to w5 are zero in the equation defining $c_j$ indicated in the above equation (3), the evaluation value $c_j$ becomes 1, and the above equation (1) becomes:

minimize $\Sigma x_j$

This becomes an equation minimizing only the total number of the vehicles.

Further, looking at the above equation (2), this equation (2) represents the condition for delivering exactly the number of sets satisfying the transportation orders.

By selecting the routes in this way, in the present system, all of information required for the transportation bases, charges, and the management of business are created.

In the past, the basic approach used had been to divide the physical distribution field into a plurality of transportation areas, designate each transportation area as a "zone", and having the physical distribution in each zone handled by its own transportation base situated in that zone. In the present transportation arrangement system, however, when making the routes, since the location conditions of the transportation bases are stored in the garage data, the present invention can eliminate the prior art zone-based system, and the optimum routes can be set merely by selecting the transportation bases satisfying both the transportation orders from a plurality of shippers and the restraint conditions on operations.

Figure 3:
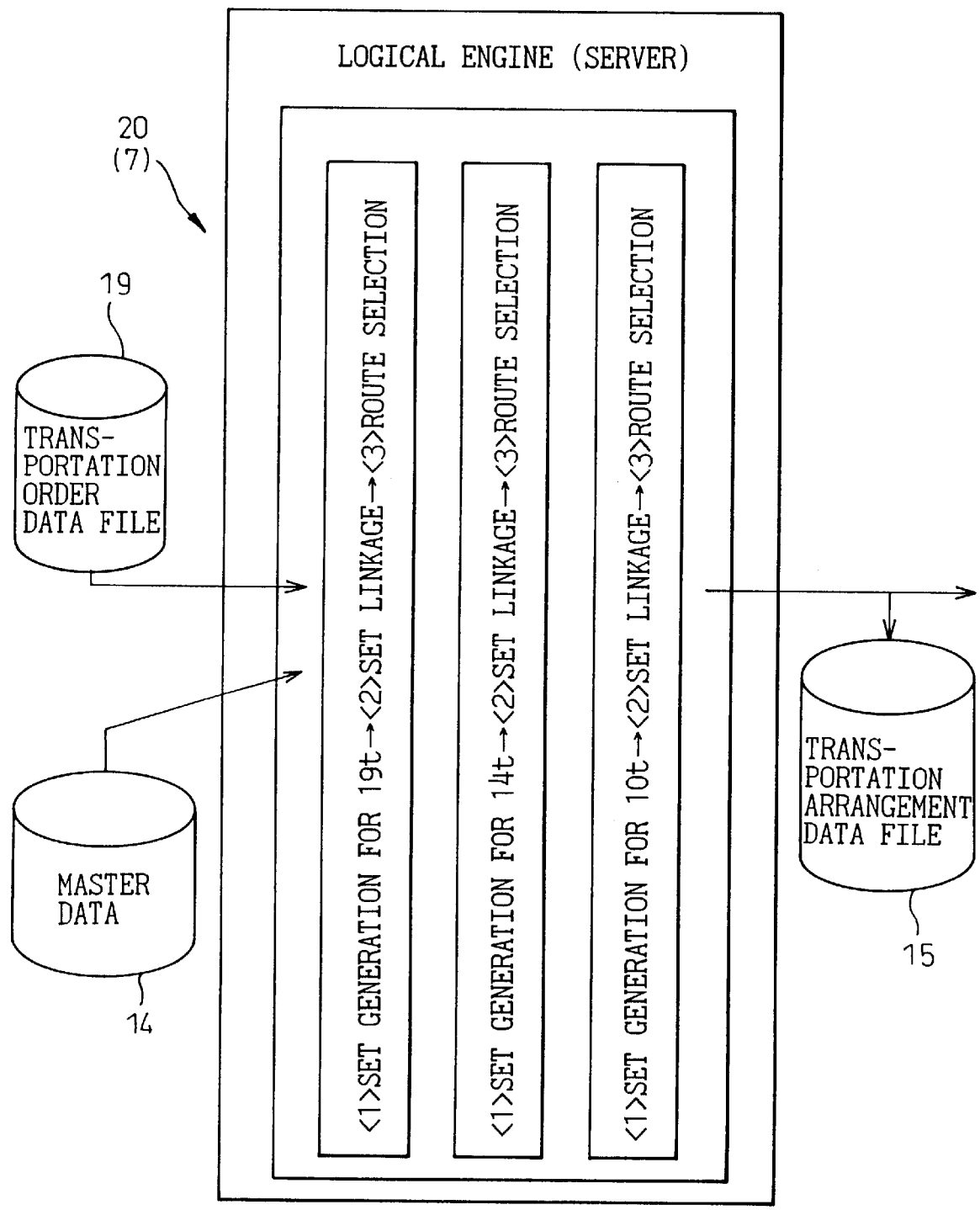
FIG. 3 is a view of an example of a specific configuration of a route making means 7 shown in FIG. 2.

FIG. 3 is a view of an example of a specific configuration of the route making means 7 shown in FIG. 2. As illustrated, the route-making means 7 is constituted by a logical engine (server computer). Using a predetermined program, each processing phase proceeds along the arrows in the figure. Note that reference numeral 19 indicates a file for storing the transportation order from the shippers as order data and is shown in FIG. 2 together with the master data file 14 and the transportation arrangement data file 15.

Looking at this example of FIG. 3 as a whole, when this logical engine 20 (route making means 7) is operated, if the vehicles V are classified into large, medium, and small sizes, the logical engine 20 first sets the routes for the large size vehicles, next sets the routes for the medium sized vehicles, and then sets the routes for the small size vehicles. A large size vehicle is a truck having the maximum load capacity of for example 19 tons. Similarly, a medium sized vehicle and small size vehicle may be trucks of maximum load capacities of 14 tons and 10 tons, respectively. In FIG. 3, "for 19 t", "for 14 t", and "for 10 t" indicate that the processing phases are advanced for the large size vehicles, medium sized vehicles, and small size vehicles, respectively.

In this way, among the various types of vehicles managed by a transportation base 2, the largest vehicles are dispatched first. When the cargoes cannot be completely transported by only the large size vehicles, next the medium size vehicles and then the small size vehicles are dispatched. As a result, all cargoes to be transported in the physical distribution field 8 can be handled by the smallest number of vehicles V.

In this case, it is also possible to proceed with each above processing phase by classifying vehicles into priority vehicles and ordinary vehicles.

Namely, when vehicles V are classified into (i) priority vehicles having a special agreement with some of the transportation bases 2 to be given them priority in use and (ii) ordinary vehicles having no such special agreement, the logical engine 20 can set routes for such priority vehicles as well. Note that whether a vehicle is a priority vehicle or ordinary vehicle is registered in the master data file 14 in advance. This enables actually existing business agreements to be flexibly handled.

Referring to FIG. 3, the logical engine 20 executes the operations of the set generation processing phase <1> for the large size vehicles (19 t) first. Next, it executes the operations of the set linkage processing phase <2> with respect to the plurality of sets obtained by the operations of the above processing phase <1>. It then further executes the operations of the route selection processing phase <3> for selecting the optimum candidate from among candidates of the plurality of routes obtained by the operations of the above processing phase <2>.

Operations of the processing phases <1>→<2>→<3> similar to those mentioned above are executed with respect to the medium size vehicles (14 t) to make the route.

Further, operations of the processing phases <1>→<2>→<3> similar to those mentioned above are executed with respect to the small size vehicles (10 t) to make the route. All of the route setup data mentioned above is is stored in the transportation arrangement data file 15.

All route data stored in the transportation arrangement data file 15 is sent as the task schedule to the physical distribution centers 1 and the transportation bases 2 via the transportation arrangement data transmission unit 16 (FIG. 2). The transportation bases 2 dispatch the vehicles managed thereby according to the transmitted transportation arrangement data.

Further, where there is a special agreement concerning operation for a transportation base 2, for example, an agreement on its share or transportation base location conditions, the related data is registered in the master data file 14 in advance and therefore can be flexibly coped with the special agreement. The "share" means the percentage of the transporting work assigned to each transportation base.

Figure 4:
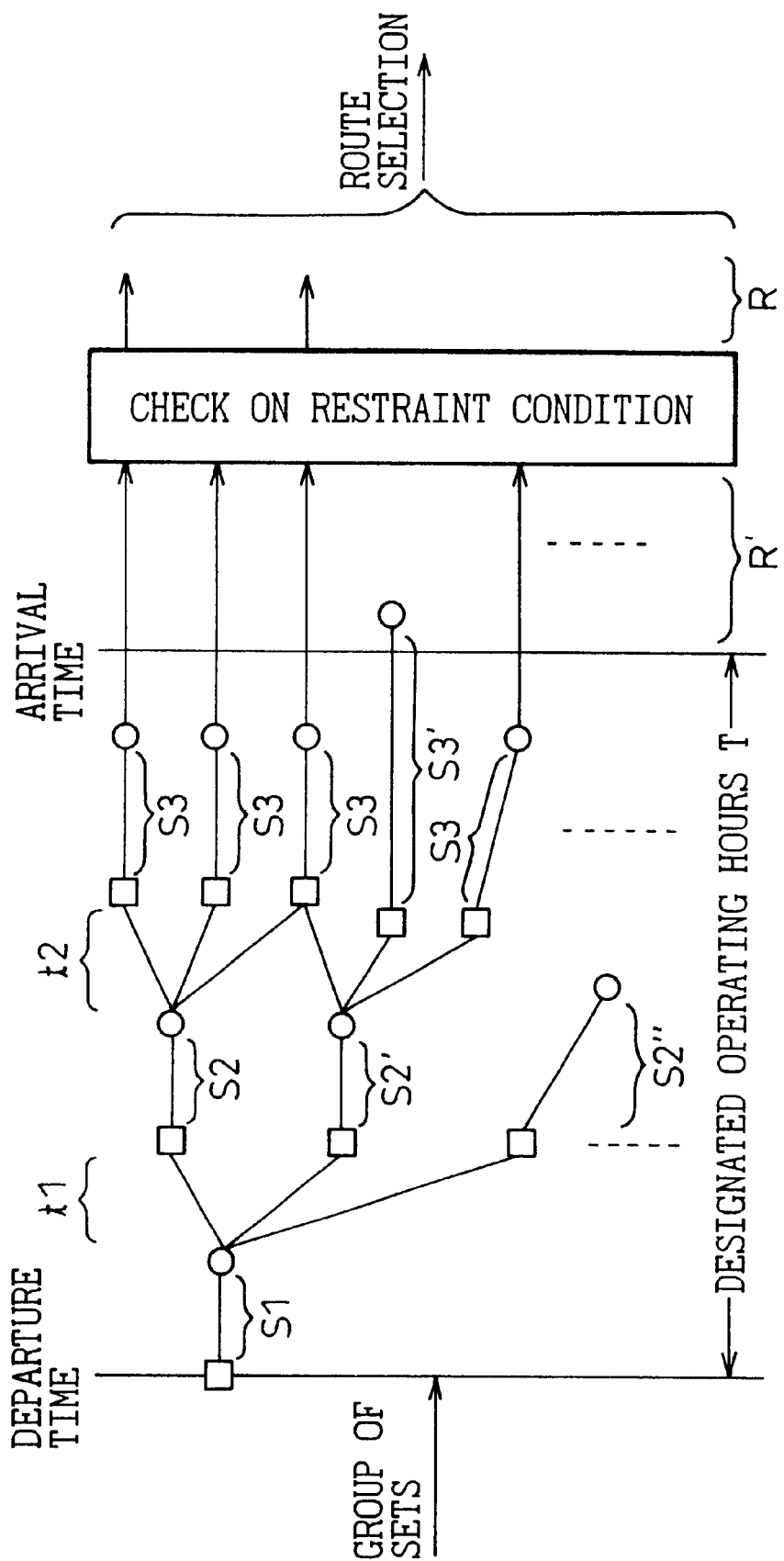
FIG. 4 is a view diagrammatically showing a concept of a set linkage shown in FIG. 3.

FIG. 4 is a view diagrammatically illustrating the concept of the set linkage shown in FIG. 3. Namely, it conceptually represents the operations executed in each processing phase <2> of FIG. 3.

The plurality of set groups calculated in the set generation processing phase <1> shown in FIG. 3 are input to the set linkage processing phase shown in FIG. 4.

In FIG. 4, first, assume that the first set S1 is specified. As the second set to be linked to this S1, in the figure, three candidates S2, S2', and S2" are indicated. In this example, these are selected in order from the one with the smallest hours t1 of empty where the vehicle drives empty after finishing the work relating to the first set S1.

When the routes linking S1 and each of S2, S2', and S2" satisfy the prescribed operating hours and restraint conditions, candidates S3 of the third set are similarly selected in order from the one having the smallest empty driving hours t2 for each of the three candidates S2, S2' and S2" of the second set. In FIG. 4, for example, when the operating hours T (for example, 9 hours per day) is provided as the restraint condition, since the third set S3' is over the operating hours T, it is removed from the candidates. Here, the operating hours are an example of an effective restraint condition. It is also possible to use other restraint conditions such as the time for returning to the garage. If a fourth set can be further selected, it would further be linked to the third set. However, in the example of the figure, only the first to the third sets are illustrated.

In this way, a large number of candidates R' of routes are generated by the set linkage. Among these candidates R', the candidates R of the routes for which the other restraint conditions mentioned above have been already checked and which have passed the same are input to the next processing phase <3>, that is, the phase for the operations for the optimum route selection.

The above operations are repeated until there is no longer any of the generated first set left. Note that operations where the garage left from and the garage arrived at are different, such as with long distance transportation, can also be handled.

Figure 5:
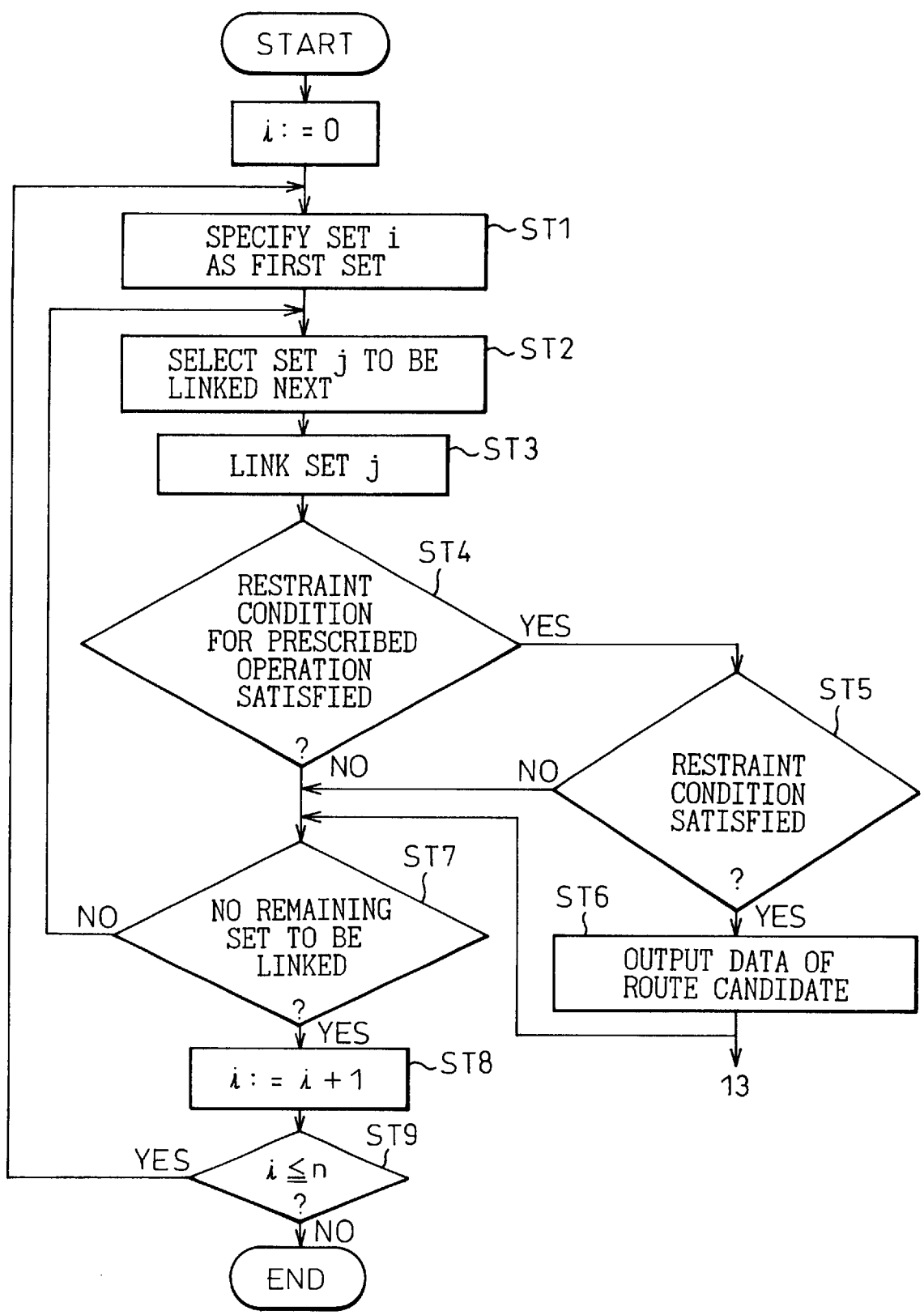
FIG. 5 is a flow chart of the operation in a route generation step.

FIG. 5 is a flow chart of the operation of the route generation step.

Step ST1: The set generating unit 11 determines a certain set i as the first set.

Step ST2: The set linking unit 12 selects a set j (second set) to be linked next to the first set. As the method of selection, there can be mentioned an example of selecting the one having the smallest empty driving hours and an example of selecting one having the shortest empty driving distance shown in FIG. 4.

Step ST3: The set linking unit 12 links the selected set j to the set i.

Step ST4: The most effective of the restraint conditions for eliminating inefficient routes is taken as the operation restraint. When the above linked set satisfies the above operation restraint (YES), the operation routine shifts to step ST5.

Here, as a representative operation restraint, there can be mentioned the operating hours and the garage return time.

Step ST5: The linked sets shifted to step ST5 are checked to see if there are any which satisfy the above restraint condition.

Step ST6: The linked sets (routes) passing the above check are output to the route selecting unit 13 as the route candidate data.

Step ST7: Where the result of step ST5 is NO and step ST6 is bypassed, the operation routine enters the present step ST7. The above steps ST1 to ST6 are repeated until there are no longer any remaining sets to be linked.

Step ST8: When there are no longer any remaining sets to be linked, the set i as the first set specified at step ST1 is updated and a set (i+1) is specified as the next first set.

Step ST9: As the first set, set i, set (i+1), . . . are sequentially specified. The above operation is repeated until the set n is reached.

According to the method shown in the flow chart of FIG. 5, the route generation can be performed efficiently by the large number of sets to be linked. This is done by eliminating as much as possible the possibility of inclusion of routes which do not require selection, for example, inefficient routes. If the linked sets were to be generated including such routes not requiring selection, the number of routes to be selected would become enormous.

As a method for eliminating such inefficient routes, in the example of the figure, there is step ST4. A considerably large number of unnecessary routes can be eliminated here.

Thus, a considerably large number of unnecessary routes are filtered out and abandoned. Thereafter, route selection is carried out by the route selecting unit 13. In this way, the transportation arrangement apparatus of the present invention is characterized in that the former route generation phase and the latter route selection phase are independent from each other. In the prior art mentioned above, these phases were simultaneously advanced mixed together so the result was an extremely inefficient transportation arrangement apparatus as a whole.

FIG. 6 is a view of an example of monitoring part of the transportation arrangement data file 15 on a display. The logical engine 20 stores the operation data, in the transportation arrangement data file 15, obtained based on the above operation with a content to be monitored as shown in the figure. Note that the present data represents the information which is required for manual transportation arrangement in manual interfacing and contributes to accuracy and ease of operation.

In FIG. 6, No. 1, 2, 3, . . . in the left column on the display of the computer indicate the numbers of the specified routes, α, β, γ, . . . indicate transportation bases (names of carriers), and L, M, and S indicate types of vehicles (large, medium, and small sized).

For example, when looking at route no. 1, the already mentioned first set S1 is assigned to the physical distribution centers a→b, and the second set S2 and the third set S3 linked with S1 in series are the physical distribution centers c→d (S2) and the physical distribution centers a→b (S3) respectively.

Figure 7:
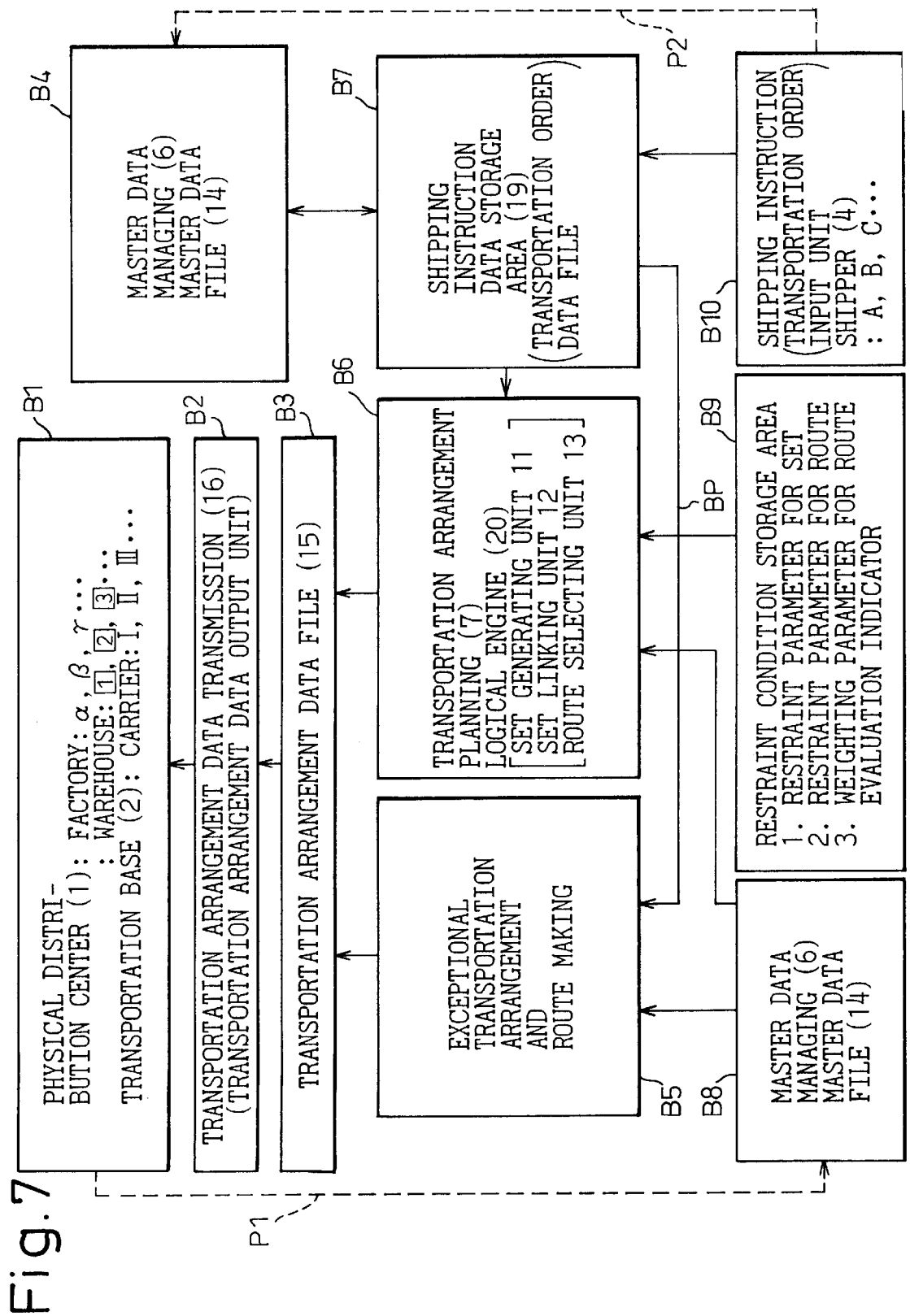
FIG. 7 is a functional block diagram of the transportation arrangement system according to the present invention.

FIG. 7 is a functional block diagram of the transportation arrangement system according to the present invention. The transportation arrangement system shown in FIG. 1 can be concretely constructed by the group of functional blocks shown in FIG. 7. Note that this is just one example of construction. When referring to FIG. 7, the flow of the processing proceeds from the lower side of the figure to the upper side. Note that parts corresponding to constituent elements explained heretofore are indicated by corresponding reference numerals in parentheses. For example, (4) in a functional block B10 corresponds to the already mentioned shipper 4.

The block B10 receives a transporting instruction (transportation order) from the shipper. Note that, in the above example, the description was made of a case of a single shipper, but there may be a plurality of shippers, for example, A, B, C, . . . .

The block B7 stores the data relating to the transportation order.

The block 34 checks the transportation order based on the master data stored in advance and supplies this to the block B7.

The block B6 is the part for drawing up the transportation arrangement plan by using the above checked data, which is primarily comprised of the logical engine 20 shown in FIG. 3. The logical processing referred to here is identical to that explained with reference to FIG. 3, FIG. 4 and FIG. 5. Further, it is also possible to determine the transportation bases, charges, etc. and perform the various types of calculations for business management according to the above determination.

The block B8 supplies the various data concerning the transportation network required for the processing in the block B6.

The block B9 also gives the information required for the processing in the block B6. Here, the aforesaid set restraint parameters, route restraint parameters, and weighting parameters for route evaluation indicator are stored.

The block B3 determines the final transportation arrangement plan according to the transportation arrangement plan drawn up at the block B6 and stores the transportation arrangement data once in the transportation arrangement data file 15.

The block B5 is an alternative path to the block B3. When drawing up a transportation arrangement plan, it is not always beneficial to use the logical engine 20. It is more flexible and convenient if a way is provided enabling the transportation arrangement plan to be drawn up manually. The bypass BP is given for bypassing the logical engine 20.

The block B2 shows the transportation arrangement plan to an operator as in FIG. 6 and transmits it to the physical distribution field 8 by the transportation arrangement data transmission unit (the dispatch data output unit) 16.

The block B1 transmits the transportation arrangement plan to be transmitted from the block B2 to each transportation base (each carrier). Further, the block B1 also transmits the loading and unloading information to each physical distribution center (warehouse or factory).

The path P1 in FIG. 7 is a transfer line for reflecting the data, to the master data file 14, concerning the transportation network (transportation bases (carriers and vehicles/garages), priority vehicles, large size vehicles, vehicle types, loading/unloading zones, speeds/distances/hours, unit prices, shares, etc.). Further, the path P2 of FIG. 7 is the transfer line for inputting, to the master data file 14, various information on the shipper side (shippers, cargo items, physical distribution centers (factories, warehouses, etc.)) etc.

Figure 8:
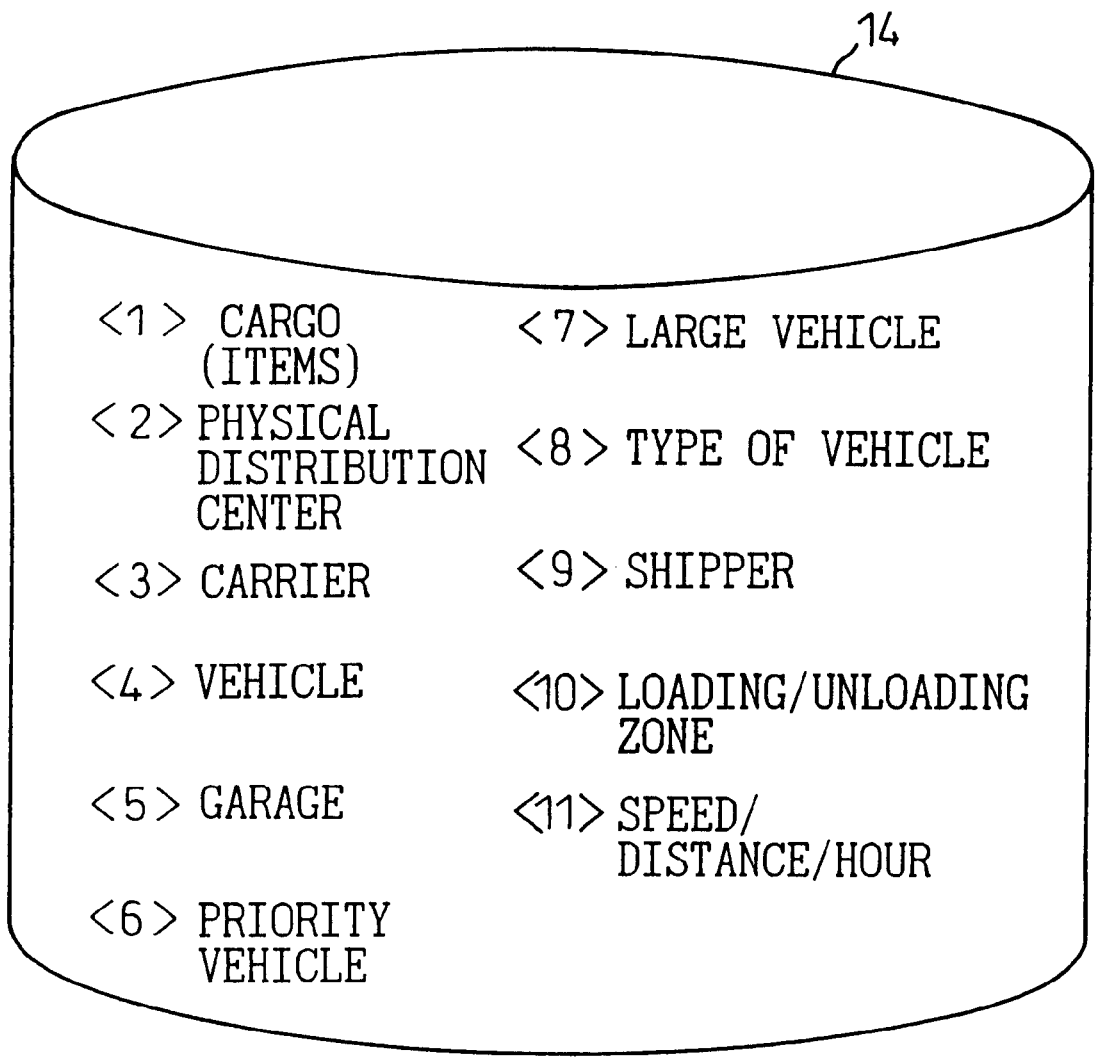
FIG. 8 is a view for explaining an example of a master stored in a master data file 14.

FIG. 8 is a view for explaining an example of the masters stored in the master data file 14. Note that only the masters particularly relating to the present invention are shown (1) Cargo item master: Information concerning the cargoes is stored.

(2) Physical distribution center master: Information concerning the warehouses and factories, particularly information required for the transportation arrangement plan, is recorded and continuously updated.

(3) Carrier master: Data concerning each contracting carrier is stored.

(4) Vehicle: Data of the vehicles available for operations is stored.

(5) Garage: Location conditions etc. of the garages of the transportation bases are stored.

(6) Priority vehicle master: Data concerning the priority vehicles is stored.

(7) Large size vehicle master: Data concerning for example the 19 ton trucks shown in FIG. 3 is stored.

(8) Vehicle type master: Data indicating how many palettes can be carried when loading several cargoes on it together is stored.

(9) Shipper master: Data concerning shippers A, B, C, . . . shown in the block B10 of FIG. 7 is stored.

(10) Loading/unloading zone master: Data classifying the combinations of the locations for loading and unloading cargoes in zones is stored when dividing the physical distribution field 8 of FIG. 1 into a plurality of zones in advance.

(11) Speed/Distance/Hour master: In the present invention, the speed, distance, required hours, etc. are determined in advance and registered for each of the routes between the physical distribution centers a→b, the physical distribution centers c→d, . . . shown in FIG. 6 respectively.

By this, the computation time required for the generation of the above mentioned sets (S1, S2, . . . ) can be shortened.

FIGS. 9A and 9B and 9C are views diagrammatically showing the effects according to the present invention. This shows various effects obtained by running a simulation of the method according to the present invention using various numerical values actually used in the method of the prior art as a model, that is, using the same details of the daily transportation orders from the shippers, the same configuration of physical distribution centers, the same sizes of transportation bases, etc.

FIG. 9A shows that the total number of vehicles dispatched is reduced by about 14%, i.e., from "100 vehicles (conventional)" in the conventional method to "86 vehicles" by the method of the present invention.

FIG. 9B is a graph of statistics on the distribution of sales of dispatched vehicles. Sales (yen) are plotted on the abscissa, and the total number of vehicles producing those sales is plotted on the ordinate. Note that, 1, 1.4, 1.6, . . . of abscissa indicate values of relative ratios. Here, the white bar graphs show the case according to the method of the prior art, while the hatched graphs show the case according to the method of the present invention.

As shown by these graphs, there is a great increase in the vehicles producing high sales per vehicle. That is, there is an increase in the number of high earning vehicles.

FIG. 9C shows that the daily fluctuation for each carrier is reduced by the present invention. In the method of the prior art, during for example one week, the fluctuation in business of each carrier between a day of the week where the dispatch rate is high and a day of the week where the dispatch rate is low was "0.4 to 2.4" (average corresponds to 1), but according to the integrated transportation arrangement method of the present invention, it is leveled to "0.8 to 1.3".

As explained above, according to the transportation arrangement system of the present invention, transportation arrangement plans for an entire physical distribution field can be drawn up centrally and integratedly by one transportation arrangement center, and the total number of vehicles dispatched in the physical distribution field can be reduced. This streamlines the physical distribution, raises the operating rate per vehicle, and consequently is advantageous to any party concerned, that is, the shippers, carriers, and the physical distribution centers. Further, it contributes to the solution of environmental problems such as the reduction of $CO_2$, $NO_x$, and other emissions.

Further, according to the transportation arrangement apparatus of the present invention, despite the usual dramatic increase in the difficulty of problem solving along with the increase in the scale of the problem (for example, the number of transportation orders), it is possible to quickly draw up a transportation arrangement plan achieving a prescribed objective, for example, the minimization of the total number of vehicles, while raising the optimality and system security and satisfying the restraint conditions, without requiring an enormous problem solving time, and possible to obtain effects such as the reduction of the total number of vehicles dispatched.

Further, it is possible to quickly follow the fluid changes in the restraint conditions in a physical distribution field.

This enables the transporting arrangement work and physical distribution to be streamlined and the operating rate per vehicle to be raised and consequently is advantageous to any party concerned, that is, the shippers, carriers, and the physical distribution centers.

What is claimed is:

1. A transportation arrangement system for operating a plurality of vehicles in accordance with transportation orders of various types of cargoes, from a plurality of shippers including a plurality of physical distribution centers for loading and unloading the various types of cargoes and a plurality of transportation bases for transporting the various types of cargoes between the plurality of physical distribution centers by the plurality of vehicles, wherein a transportation arrangement center operates among the plurality of shippers, the plurality of physical distribution centers and the plurality of transportation bases, for drawing up operations plans for the plurality of vehicles, the transportation arrangement center is provided with:

a master data managing means for managing at least cargo item data relating to groups of the various types of cargoes, physical distribution center data relating to the plurality of physical distribution centers, and vehicle and garage data relating to the plurality of vehicles managed by the plurality of transportation bases and the garages from which these vehicles operate and a route making means for making routes for the plurality of vehicles in accordance with the transportation orders from the plurality of shippers based on at least the cargo item data, the physical distribution center data, and the vehicle and garage data which are in the master data managing means, the route making means is operative to make routes minimizing the total number of vehicles dispatched.

2. A transportation arrangement system as set forth in claim 1, wherein said route making means is provided with a set generating unit for generating, when defining a group of cargoes able to be loaded on one vehicle in accordance with the transportation orders from the shippers as one set of operation data, a plurality of sets, for a plurality of vehicles, for every departure and arrival location.

3. A transportation arrangement system as set forth in claim 2, wherein said route making means further is provided with a set linking unit for setting a plurality of candidates of routes when defining a plurality of sets as one route, which sets can be linked in series with each other among the plurality of sets generated by said set generating unit.

4. A transportation arrangement system as set forth in claim 3, wherein said route making means further is provided with a route selecting unit for selecting one of said routes among said plurality of candidates of routes generated by said linking unit, which routes satisfy the transportation orders from the plurality of shippers and restraint conditions in operations and minimizes the total number of vehicles.

5. A transportation arrangement system as set forth in claim 1, wherein, when the plurality of vehicles are classified into priority vehicles having a special agreement with some of the plurality of transportation bases to be given them priority in use and ordinary vehicles not having said special agreement, said route making means makes routes for said priority vehicles as well.

6. A transportation arrangement system for operating a plurality of vehicles in accordance with transportation orders from a plurality of shippers of various types of cargoes, including a plurality of physical distribution centers for loading and unloading the various types of cargoes and a plurality of transportation bases for transporting the various types of cargoes between the plurality of physical distribution centers by the plurality of vehicles, wherein a transportation arrangement center operates among the plurality of shippers, the plurality of physical distribution centers and the plurality of transportation bases, for drawing up operations plans for the plurality of vehicles, the transportation arrangement center is provided with:

a master data managing means for managing at least cargo item data relating to groups of the various types of cargoes, physical distribution center data relating to the plurality of physical distribution centers, and vehicle and garage data relating to the plurality of vehicles managed by the plurality of transportation bases and the garages from which these vehicles operate and a route making means for making routes for the plurality of vehicles in accordance with the transportation orders from the plurality of shippers based on at least the cargo item data, the physical distribution center data, and the vehicle and garage data which are in the master data managing means, the route making means is operative to select the transportation bases satisfying the transportation orders from the plurality of shippers and restraint conditions on operations.

7. A transportation arrangement system as set forth in claim 6, wherein where there are special agreements on shares of operations for the plurality of transportation bases, said route making means makes the routes in accordance with the shares of the transportation bases.

8. A transportation arrangement apparatus comprising:

a master data managing means for managing at least cargo item data relating to groups of various types of cargoes, physical distribution center data relating to a plurality of physical distribution centers, and vehicle and garage data relating to a plurality of vehicles managed by a plurality of transportation bases and the garages from which these vehicles operate and a route making means for making routes for the plurality of vehicles in accordance with transportation orders based on at least the cargo item data, the physical distribution center data, and the vehicle and garage data which are in the master data managing means, said route making means being provided with:

a set generating unit for generating, when defining a group of cargoes able to be loaded on one vehicle in accordance with the transportation orders from the shippers as one set of operation data, a plurality of sets, for a plurality of vehicles, for every departure and arrival location, a set linking unit for setting, when defining said plurality of sets as one route, which sets can be linked in series with each other among the plurality of sets generated by said set generating unit, a plurality of candidates of routes, and a route selecting unit for selecting routes from among the plurality of routes generated by said set linking unit, which routes satisfy the transportation orders and restraint conditions in operations and minimizes or maximizes at least one predetermined route evaluation indicator among route evaluation indicators serving as operating conditions during operations, where set generation by said set generating unit and route candidates generation by said set linking unit and route selection by said route selecting unit are processed independent from each other.

9. A transportation arrangement apparatus as set forth in claim 8, wherein said route generation gives only the routes to said route selection after exclusion of routes not requiring selection.

10. A transportation arrangement apparatus as set forth in claim 8, wherein said route evaluation indicators are selected from the group consisting of the number of vehicles, empty driving hours, overtime hours, left-over hours, returning time, and combinations thereof.

11. A transportation arrangement apparatus as set forth in claim 10, wherein said route evaluation indicator is the number of vehicles.

12. A transportation arrangement apparatus as set forth in claim 11, wherein when the number of vehicles is defined by a decision variable x and an evaluation value is defined by c, the route is selected so as to minimize the sum of cx obtained for each of the plurality of routes generated by said set generating unit and said set linking unit.

13. A transportation arrangement apparatus as set forth in claim 12, wherein said evaluation value c is obtained by summing the multiplied values of weighting parameters given to the plurality of route evaluation indicators and respective route evaluation indicators corresponding to each of the weighting parameters, the magnitude of the weighting parameters is set in accordance with the degree of attention paid to said route evaluation indicators.

\* \* \* \* \*